(12) United States Patent
Arnesson et al.

(10) Patent No.: US 12,555,860 B2
(45) Date of Patent: Feb. 17, 2026

(54) BATTERY STACK COMPRISING STACKABLE BATTERY MODULES

(71) Applicant: VOLVO TRUCK CORPORATION, Gothenburg (SE)

(72) Inventors: Simon Arnesson, Öckerö (SE); Ringolds Jargans, Trollhättan (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 259 days.

(21) Appl. No.: 18/343,273

(22) Filed: Jun. 28, 2023

(65) Prior Publication Data

US 2024/0014497 A1  Jan. 11, 2024

(30) Foreign Application Priority Data

Jul. 11, 2022 (EP) .................................... 22184102

(51) Int. Cl.
*B60K 1/04* (2019.01)
*B60L 50/64* (2019.01)
(Continued)

(52) U.S. Cl.
CPC ........... *H01M 50/249* (2021.01); *B60L 50/64* (2019.02); *H01M 50/204* (2021.01); *H01M 50/258* (2021.01); *H01M 2220/20* (2013.01)

(58) Field of Classification Search
CPC ............. H01M 50/251; H01M 50/233; H01M 50/258; H01M 50/204; H01M 50/249; H01M 2220/20; B60L 50/64; B60K 1/04
See application file for complete search history.

(56) References Cited

U.S. PATENT DOCUMENTS 8,551,640 B2 * 10/2013 Hedrich ............ H01M 10/6557
429/158
12,283,675 B2 * 4/2025 Tang ................... H01M 50/258
(Continued)

FOREIGN PATENT DOCUMENTS

CN 111916611 A 11/2020
DE 102015217782 A1 3/2017
(Continued)

OTHER PUBLICATIONS

European Search Report dated Jan. 25, 2023 in corresponding European Patent Application No. 22184102.6, 24 pages.

*Primary Examiner* — Jason D Shanske
*Assistant Examiner* — James J Triggs
(74) *Attorney, Agent, or Firm* — Jeffri A. Kaminski; Venable LLP (57) ABSTRACT

A battery stack includes a first battery module and a second battery module, each comprising battery cells being stacked in a depth direction. The first battery module and the second battery modules each comprises a first and a second supporting side wall supporting the battery cells. The first and the second supporting side walls are on a respective side of the battery cells of the respective battery modules and extend in a height direction between a respective upper edge surface and a respective lower edge surface of the respective side walls. The respective upper edge surface of the first and the second side walls of the first battery module have a respective upper stacking member and the respective lower edge surface of the first and the second side walls of the second battery module have a respective lower stacking member. The lower stacking members of the second battery module fit on and are supported by the upper stacking members of the first battery module when stacking the (Continued)

second battery module onto the first battery module in the height direction.

12 Claims, 5 Drawing Sheets

(51) Int. Cl.
*H01M 50/204* (2021.01)
*H01M 50/249* (2021.01)
*H01M 50/258* (2021.01)

(56) References Cited

U.S. PATENT DOCUMENTS

| 2007/0281208 A1 | 12/2007 | Yoon et al. |
| 2013/0316212 A1 | 11/2013 | Lee et al. |
| 2015/0064542 A1 | 3/2015 | Noh et al. |

FOREIGN PATENT DOCUMENTS

| JP | 2014154504 A | 8/2014 |
| WO | 2015140977 A1 | 9/2015 |

* cited by examiner

BATTERY STACK COMPRISING STACKABLE BATTERY MODULES

TECHNICAL FIELD

The present invention relates to a battery stack for a vehicle, more specifically the present invention relates to a battery stack comprising stackable battery modules.

BACKGROUND

Batteries are becoming a common source of power for providing propulsion for vehicles. Such batteries are often rechargeable batteries and typically include a number of battery modules having a number of battery cells that may be connected in series or in parallel forming a complete battery system for the vehicle.

With trucks, trailers and/commercial vehicles, space within the vehicle frame is typically at a premium because the space typically must support assorted components, such as, by way of example, air tanks, service lines, fuel tanks, fuel and electrical lines, hydraulic lines and systems, drive trains and accessories, and/or the like.

In addition, such vehicles often carry multiple battery modules arranged in a battery system. It is often needed to vertically stack the battery modules in several layers due to specifics of space available for installation of battery pack. Such stack-up needs to be mechanically durable for vehicle vibrations and loads.

Typical solutions include adding internal frame/shelves for module support. This however add additional complexity, material and cost to the final product.

In view of the above, it is an object to provide a flexible, yet stable battery stack allowing facilitated access to the battery cells.

SUMMARY

It is an object of the present disclosure to provide a battery stack that at least partially overcomes the above-described deficiencies.

According to a first aspect, the present disclosure relates to a battery stack for a vehicle, the battery stack comprising a first battery module and a second battery module, each comprising battery cells being stacked in a depth direction. The first battery module and the second battery modules each comprises a first and a second supporting side wall for supporting the battery cells in the respective first and second battery module. The first and the second supporting side walls of the respective battery modules are opposing side walls, provided on a respective side of the battery cells of the respective battery modules and extending in a height direction between a respective upper edge surface and a respective lower edge surface of the respective side walls. The respective upper edge surface of the first and the second side walls of the first battery module are provided with a respective upper stacking member and the respective lower edge surface of the first and the second side walls of the second battery module are provided with a respective lower stacking member, the lower stacking members of the second battery module being configured to fit on and being supported by the upper stacking members of the first battery module when stacking the second battery module onto the first battery module in the height direction.

For certain vehicles, there may be a needed to vertically stack the battery modules in several layers due to specifics of space available for installation of battery pack. Such stack-up needs to be mechanically durable for vehicle vibrations and loads. Typical solutions include adding internal frame/shelves for module support. This however add additional complexity, material and cost to the final product.

The respective battery modules according to the present discloses includes an integrated stackable support structure for stacking of the battery modules, as seen in the height direction, and battery cells being stacked in the depth direction of the battery stack. The stackable support structure of each battery module comprises at least a respective first and second supporting side wall comprising stacking members thereby providing improved stability for the stacked battery modules with a less complex and more cost efficient battery stack structure.

Each one of the stacking members may comprise a respective stacking step. Each stacking step may comprise or consist of a first support surface arranged at a first level and a second support surface arranged at a second level, the second level being the uppermost level, as seen in the height direction of the battery stack. The height direction of the battery stack is perpendicular to the width direction of the battery stack.

Optionally, each one of the stacking members has a respective profile comprising a track and a protrusion, as seen in the width direction, the respective profile being configured such that the lower stacking members of the second battery module match and fit with the upper stacking members of the first battery module and thereby lock the first and the second battery module from moving in the height direction.

The first side wall of the respective first and second battery module may comprise a respective first inner side and the second side wall of the respective first and second battery module may comprises a second inner side. Each of the respective first and second inner sides of the first and the second battery modules may be provided with a respective lower flange for supporting the battery cells, as seen in the height direction. Alternatively, each of the respective first and second inner sides of the first and the second battery modules may be provided with a respective lower and upper flange for supporting the battery cells, as seen in the height direction.

The respective lower flanges of the first and second battery modules may constitute the respective lower edge surface of the respective first and second side walls of the first and second battery module.

The battery stack may comprise at least a third and a fourth battery module, the third battery module may comprise the features of the first battery module and the fourth battery module may comprise the features of the second battery module, the third battery module being arranged adjacent the first battery module, as seen in the width direction, and the fourth battery module being arranged adjacent the second battery module, as seen in the width direction.

In a preferred embodiment, the battery stack comprises multiple battery modules, according to the present disclosure, being stacked in a height direction. Each of the multiple battery modules may comprise a first and a second side wall. An upper edge surface of each of the first and second side walls may be provided with a respective upper stacking member. A respective lower edge surface of the first and the second side walls may furthermore be provided with a respective lower stacking member. The lower stacking members of the second battery module may be configured to fit on and being supported by the upper stacking members of the first battery module when stacking one of the battery modules onto another one of the battery modules, as seen in the height direction. Such battery stack may furthermore comprise multiple rows of stacked battery modules, as seen in the width directions.

The upper stacking member of the first side wall of the first battery module and an upper stacking member of an adjacent side wall of the third battery module may each comprise a stacking step forming together an upper common stacking member. The lower stacking member of the first side wall of the second battery module and a lower stacking member of an adjacent side wall of the fourth battery module may furthermore each comprise a stacking step forming together a lower common stacking member. The upper and lower common stacking members may be mating stacking members comprising or consisting of a protruding stacking member and a groove, as seen in the height direction of the battery stack, allowing stacking in a height direction and preventing movement of the battery modules in the width direction of the battery stack.

The battery modules may each comprise a bottom support plate and/or an upper support plate. Each of the battery modules of the battery stack may alternatively be free from an upper and/or bottom support wall. This provides a stable battery stack with reduced components and thus complexity.

According a second aspect, the present disclosure relates to an electrical propulsion system comprising an electrical machine and a battery stack according to the first aspect, wherein the electric machine is configured to receive power from the battery stack.

According to a third aspect, the present disclosure relates to a vehicle comprising a battery stack according to the first aspect or an electrical propulsion system according to the second aspect.

According to a fourth aspect, the present disclosure relates to a stationary energy storing system comprising a battery stack according to the first aspect.

According to a fifth aspect, the present disclosure relates to a marine vessel comprising the battery stack according to the first aspect.

The battery stack may thus be used in various applications, such as busses, trucks, construction equipment, marine vessels and/or industrial equipments and the present disclosure relates to each of these applications comprising a battery stack according to the present disclosure.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

The above, as well as additional objects, features and advantages of the present invention, will be better understood through the following illustrative and non-limiting detailed description of exemplary embodiments of the present invention, wherein.

DETAIL DESCRIPTION

The present disclosure will now be described more fully hereinafter with reference to the accompanying drawings, in which exemplary embodiments are shown. The disclosure may, however, be embodied in many different forms and should not be construed as limited to the embodiments set forth herein; rather, these embodiments are provided for thoroughness and completeness. Like reference character refer to like elements throughout the description.

Figure 1:
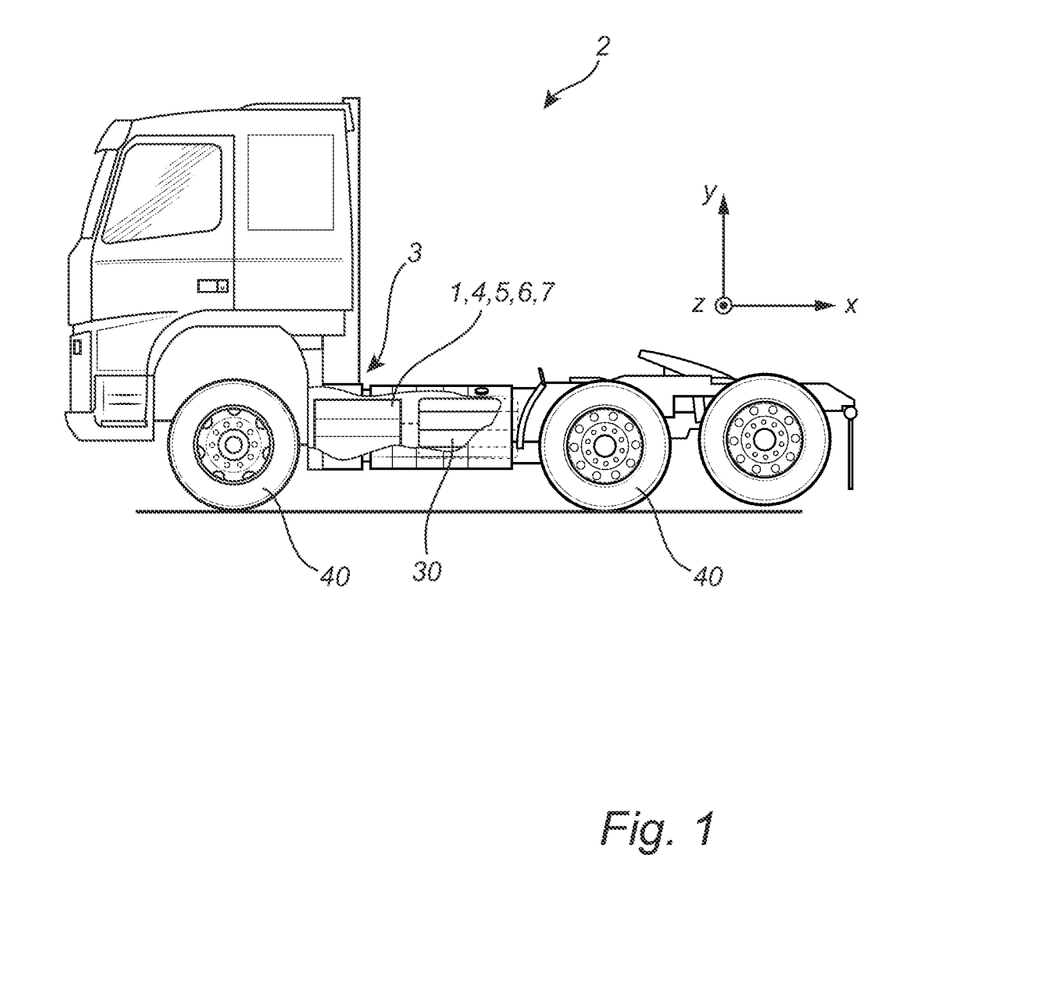
FIG. 1 is a side view of a vehicle comprising a battery stack according to the present invention.

FIG. 1 illustrates a vehicle 2 in the form of an electrified truck with an electrified propulsion. The electrified truck is powered by an electrical energy storage system in comprising a battery stack 1. The electrified truck 2 comprises an electrical propulsion system 3 configured to provide traction power to the vehicle 2. The electrical propulsion system 3 provides electrical power to an electrical motor 30. The electrical propulsion system comprises the battery stack 1 and the electrical motor The battery stack 1 is connected to the electrical motor 30 to provide power to the electrical motor 30, thereby the electrical motor 30 can provide traction power to one or more ground engaging members, e.g. one or more wheels 40. The battery stack 1 comprises at least a first and a second battery module 4,5, each comprising a number of battery cells respectively 6,7.

Figure 2:
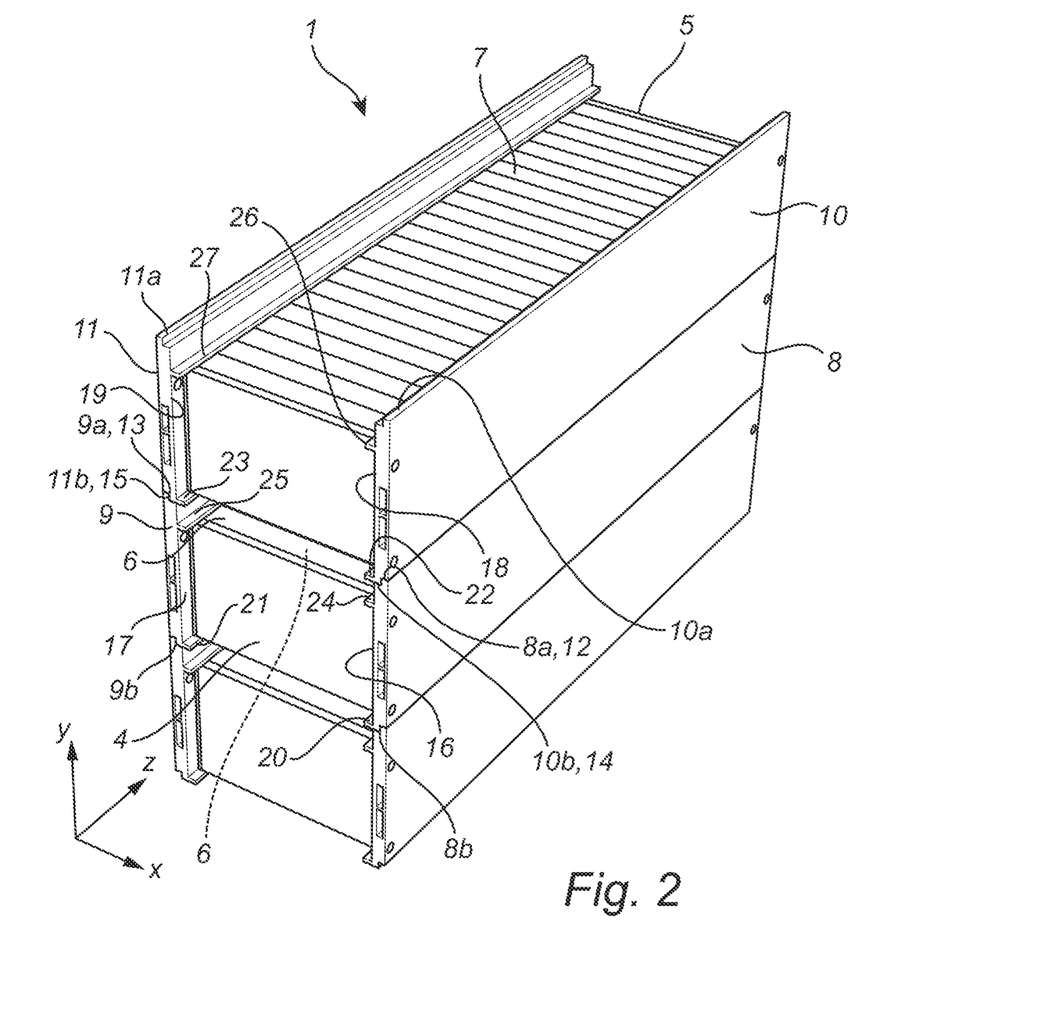
FIG. 2 is a schematic sideview of a battery stack according to an example of the present invention.

As illustrated in FIG. 2, the battery stack 1 shown in FIG. 1, includes a plurality of battery modules including the first battery module 4 and the second battery module 5. Moreover, each one of the battery modules comprises a number of battery cells 6,7 stacked in the depth direction z. The battery cells 6,7 are stacked in a depth direction z of the battery stack 1. The battery stack according to FIG. 2 comprises three battery modules. However, the battery stack may comprise four, five, six, seven or eight battery modules, or more. Each one of the battery modules comprises battery cells. The battery stack may generally comprise 50-1500 battery cells. The number of battery modules in the battery stack and the number of battery cells varies depending on type of vehicle and type of installation, etc.

The first battery module 4 comprises a first and a second supporting side wall 8,9 and the second battery module 5 comprises a first and a second supporting side wall for supporting the battery cells 6,7 in the respective first and second battery module 4,5. The first and the second supporting side walls 8,9,10, 11 of the respective battery modules 4,5 are opposing side walls, provided on a respective side of the battery cells 6,7 of the respective battery modules 4,5. The first and the second supporting side walls 8,9,10,11 extend in a height direction y between a respective upper edge surface 8a,9a,10a,11a and a respective lower edge surface 8b,9b,10b,11b of the respective side wall 8,9,10,11. The respective upper edge surface 8a,9a of the first and the second side walls 8,9 of the first battery module 4 are provided with a respective upper stacking member 12,13 and the respective lower edge surface 10b,11b of the first and the second side walls 10,11 of the second battery module 4,5 are provided with a respective lower stacking member 14,15.

The stacking members 14,15 illustrated in FIG. 2 are in the form of stacking steps comprising or consisting of a first support surface arranged at a first level and a second support surface arranged at a second level, the second level being the uppermost level, as seen in the height direction y. The lower stacking members 14,15 of the second battery module 5 are configured to fit on and being supported by the upper stacking members 12,13 of the first battery module 4 when stacking the second battery module 5 onto the first battery module 4 in the height direction y.

The respective first side wall 8,10 of the first and second battery module 4,5 comprises a respective first inner side 16,18 and the respective second side wall 9,11 of the first and second battery module 4,5 comprises a respective second inner side 17,19. Each of the first and second inner sides 16,17,18,19 of the side walls 8,9,10,11 of the first and the second battery modules 4,5 are provided with a respective lower 20,21,22,23 and upper flange 24,25,26,27 for supporting the battery cells 6,7, as seen in the height direction y.

The lower flanges 20,21,22,23 of the first and second battery modules 4,5 constitute the respective lower edge surface 8b,9b,10b,11b of the respective first and second side walls 8,9,10,11 of the first and second battery module 4,5.

The three battery modules 4,5 in FIG. 2 are identical battery modules comprising upper and lower stacking members 12,13,14,15 on each of their respective upper and lower edge surfaces 8a,9a,10a,11a,8b,9b,10b,11b. The battery stack may thus preferably comprise battery modules comprising upper and lower stacking members on each of their respective upper and lower edge surfaces as disclosed in FIG. 2.

Figure 3:
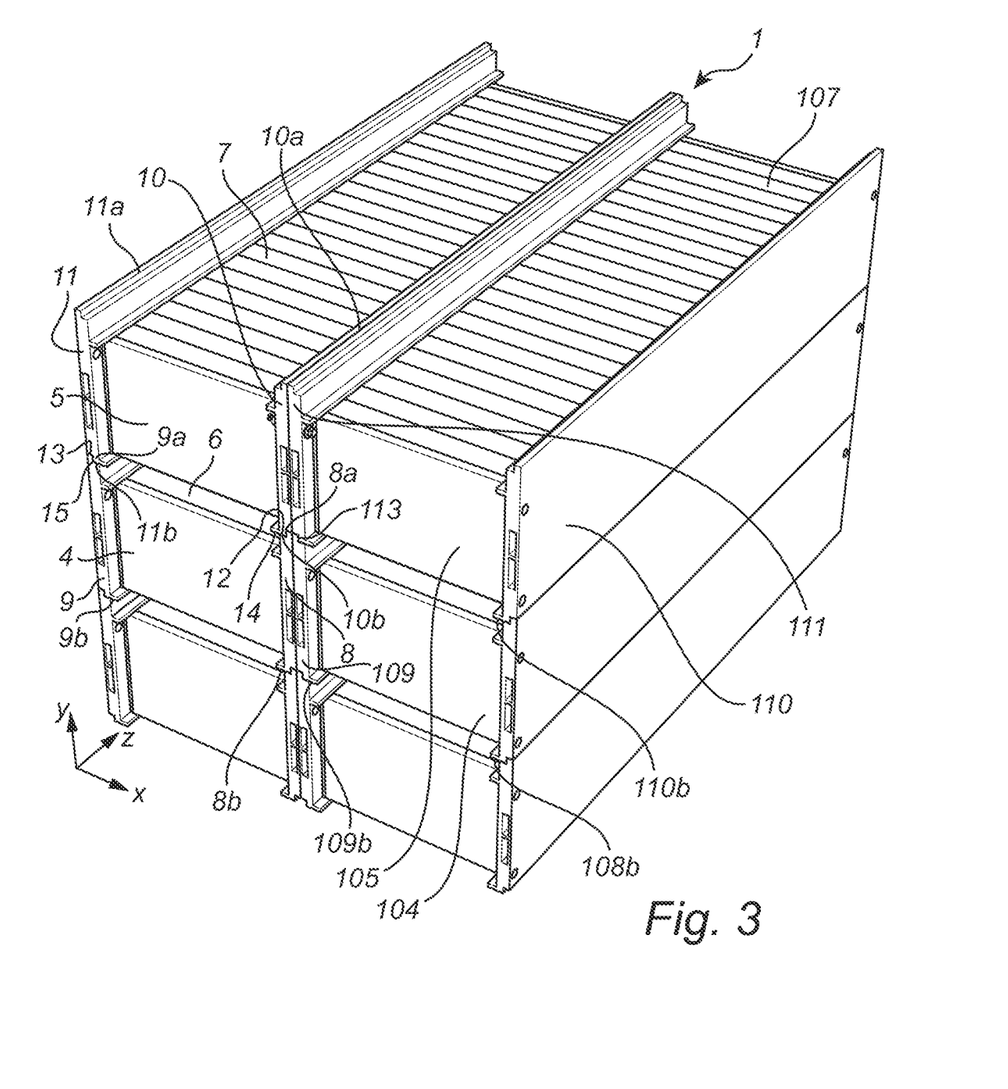
FIG. 3 is a schematic sideview of a battery stack according to an example of the present invention.
Figure 4:
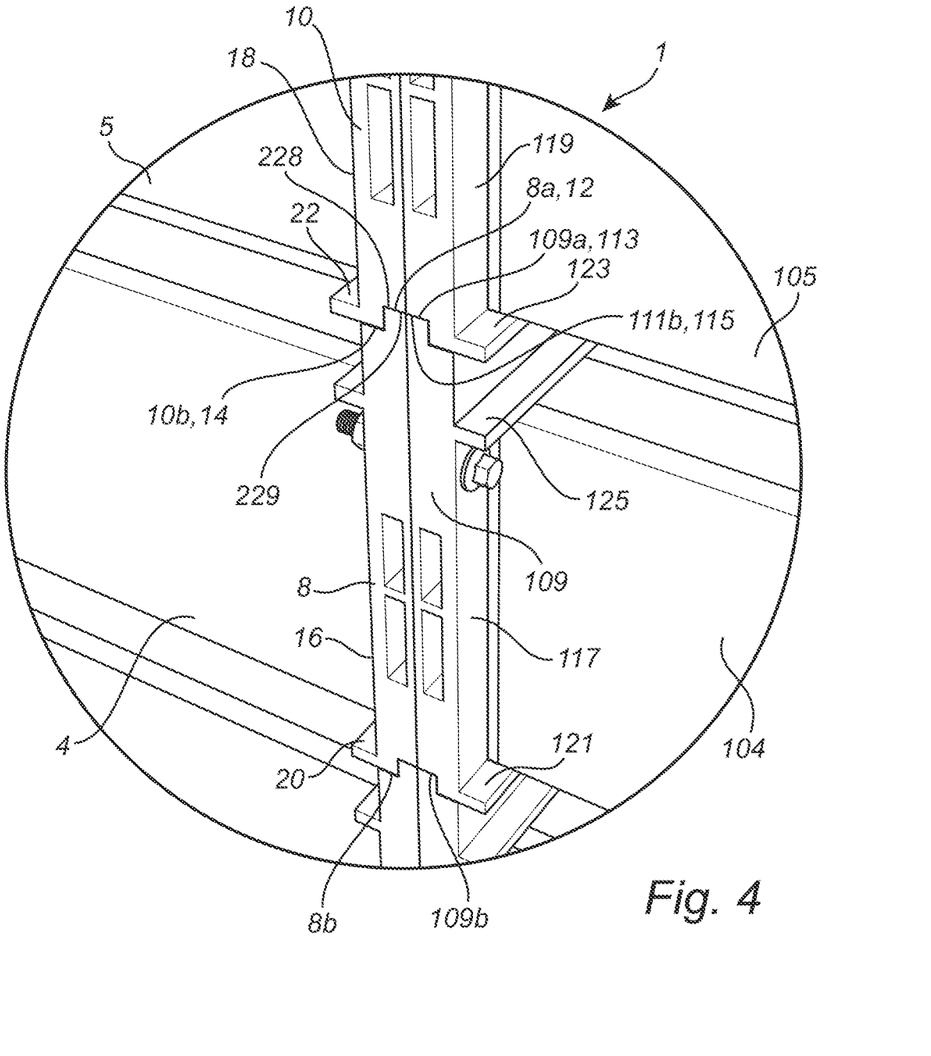
FIG. 4 is a zoomed-in view of the battery stack of FIG. 3.

FIGS. 3 and 4 illustrate a battery stack 1 comprising the three battery modules 4,5 illustrated in FIG. 2. The battery stack 1 comprises an additional three battery modules being arranged adjacent, as seen in the width direction x, the three battery modules 4,5 illustrated in FIG. 2. The additional battery modules includes a third and a fourth battery module 104,105. The battery modules illustrated in FIG. 3 are identical battery modules allowing stacking, as seen in the height direction y.

As illustrated in FIG. 4, the upper stacking member 12 of the first side wall 8 of the first battery module 4 and an upper stacking member 113 of an adjacent side wall 109 of the third battery module 104 each comprises a stacking step forming together an upper common stacking member 228 and the lower stacking member 14 of the first side wall 10 of the second battery module 5 and a lower stacking member 115 of an adjacent side wall 111 of the fourth battery module 105 each comprises a stacking step forming together a lower common stacking member 229. The upper and lower common stacking members 228,229 are mating stacking members comprising or consisting of a vertically protruding stacking member and a groove allowing stacking in a height direction y and preventing movement of the battery modules 4,5,104,105 in a width direction x.

Figure 5:
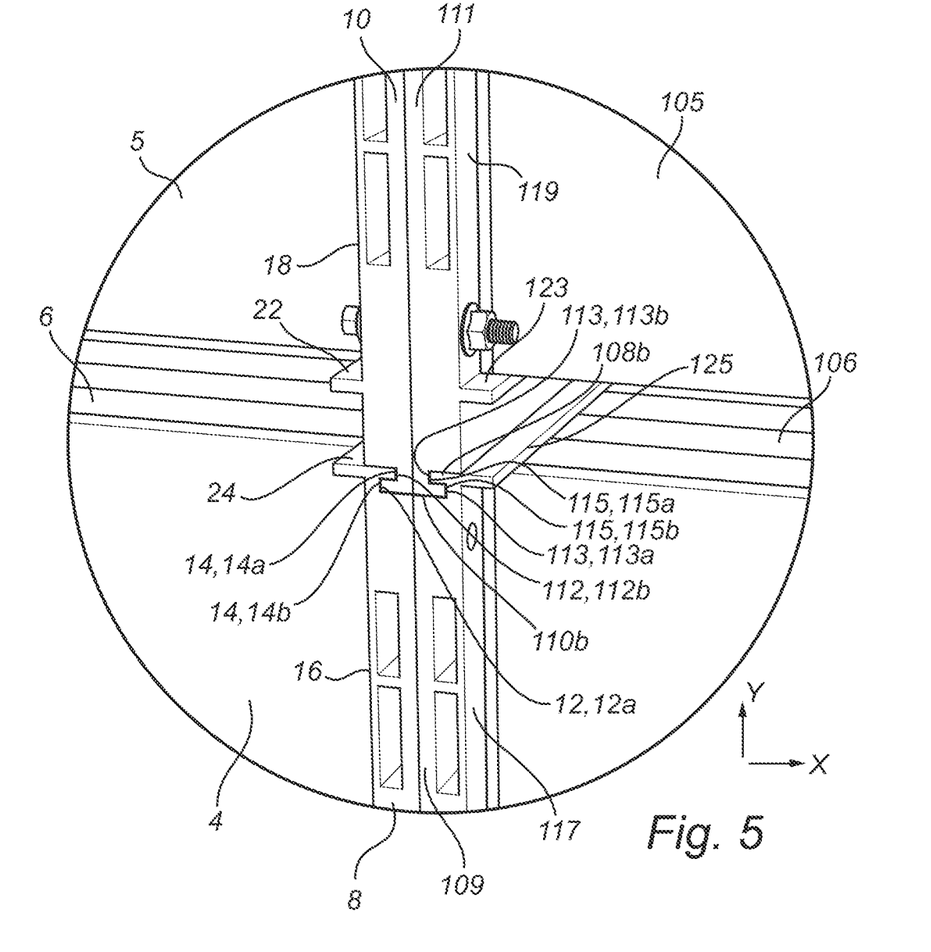
FIG. 5 shows alternative stackable members of a battery stack according to the present disclosure.

FIG. 5 illustrates an alternative battery stack 1 comprising an alternative type of stacking members 12,14, wherein each one of the stacking members 12,14 has a respective profile comprising a track 12a,113a,14a,115b and a protrusion 12b,113b,14b,115b, as seen in the width direction x. The respective profile being configured such that the lower stacking members 14,115 of the second battery module 5 match and fit with the upper stacking members 12,113 of the first battery module 4 and thereby lock the first and the second battery module 4,5 movement in the height direction y.

The invention claimed is:

1. A battery stack for a battery system in a vehicle, the battery stack comprising a first battery module and a second battery module, each comprising battery cells being stacked in a depth direction, the first battery module and the second battery modules each comprises a first and a second supporting side wall for supporting the battery cells in the respective first and second battery module, the first and the second supporting side walls of the respective battery modules being opposing side walls, provided on a respective side of the battery cells of the respective battery modules and extending in a height direction between a respective upper edge surface and a respective lower edge surface of the respective side walls, wherein the respective upper edge surface of the first and the second side walls of the first battery module are provided with a respective upper stacking member and the respective lower edge surface of the first and the second side walls of the second battery module are provided with a respective lower stacking member, the lower stacking members of the second battery module being configured to fit on and being supported by the upper stacking members of the first battery module when stacking the second battery module onto the first battery module in the height direction.

2. The battery stack according to claim 1, wherein each one of the stacking members comprises a respective stacking step.

3. The battery stack according claim 1, wherein each one of the stacking members has a respective profile comprising a track and a protrusion, as seen in the width direction, the respective profile being configured such that the lower stacking members of the second battery module match and fit with the upper stacking members of the first battery module and thereby lock the first and the second battery module from movement in the height direction.

4. The battery stack according to claim 1, wherein the first side wall of the first and second battery module respectively comprises a first inner side and the second side wall of the first and second battery module respectively comprises a second inner side, each of the first and second inner sides of the first and the second battery modules being provided with a respective lower and an upper flange for supporting the battery cells, as seen in the height direction.

5. The battery stack according to claim 4, wherein the lower flanges of the first and second battery modules are the respective lower edge surface of the respective first and second side walls of the first and second battery module.

6. The battery stack according to claim 1, wherein the battery stack comprises at least a third and a fourth battery module, the third battery module comprising the features of the first battery module and the fourth battery module comprising the features of the second battery module, the third battery module being arranged adjacent the first battery module, as seen in the width direction, and the fourth battery module being arranged adjacent the second battery module, as seen in the width direction.

7. The battery stack according to claim 6, wherein the upper stacking member of the first side wall of the first battery module and an upper stacking member of an adjacent side wall of the third battery module each comprises a stacking step forming together an upper common stacking member and the lower stacking member of the first side wall of the second battery module and a lower stacking member of an adjacent side wall of the fourth battery module each comprises a stacking step forming together a lower common stacking member, the upper and lower common stacking members being mating stacking members comprising or consisting of a vertically protruding stacking member and a groove allowing stacking in a height direction and preventing movement of the battery modules in a width direction.

8. The battery stack according to claim 1, wherein each of the battery modules of the battery stack are free from an upper and/or bottom support wall.

9. An electrical propulsion system comprising an electrical machine and a battery stack according to claim 1, wherein the electric machine is configured to receive power from the battery stack.

10. A vehicle comprising a battery stack according to claim 1.

11. A stationary energy storing system comprising a battery stack according to claim 1.

12. A marine vessel comprising a battery stack according to claim 1.

* * * * *